3,506,471
PRESSURE-SENSITIVE FLUORANE DERIVATIVE
CONTAINING COPYING PAPER
Shiro Kimura, Teruo Kobayashi, and Sadao Shige, Kanagawa, Shizio Katayama, Shizuoka, and Isao Hirano and Toshiyuki Nita, Tokyo, Japan, assignors to Fuji Photo Film Co., Ltd., Kanagawa, Japan
No Drawing. Filed Nov. 14, 1967, Ser. No. 682,983
Claims priority, application Japan, Nov. 14, 1966, 41/74,794
Int. Cl. B41c 1/06
U.S. Cl. 117—36.2  4 Claims

ABSTRACT OF THE DISCLOSURE

A pressure-sensitive copy, transferring sheet containing a fluorane derivative of the following formula:

[Chemical structure diagram]

wherein R is a lower alkyl group having from 1 to 4 carbon atoms.

BACKGROUND OF THE INVENTION

Field of the invention

The present invention relates to a pressure-sensitive copying paper, and more particularly it relates to a pressure-sensitive transferring sheet in which fluorane derivatives are used as coloring agents.

Description of the prior art

Usually, a pressure-sensitive copying paper consists of a transferring sheet and a receiving sheet. An electron-donor, colorless, organic compound (hereinafter, called "coloring agent") is dissolved in oil and enclosed in a microcapsule, and the microcapsules are coated on one surface of the transferring sheet. On the other hand, an electron acceptor, solid acid, with a binder, is coated on one surface of the receiving sheet.

Both sheets are superimposed so as to face each other in the same direction. If pressure is applied to these sheets by means of handwriting or typewriting, the capsules on the pressed portions are broken and the coloring agent comes into adsorption contact with the solid acid, whereby a distinctively colored localized mark is produced on the top surface of the under sheet.

This process is utilized in the copying paper of this invention.

As the electron acceptor, solid acids, there are used known clays, e.g., fuller's earth (Japanese acid clay), attapulgite, zeolite, bentonite and kaolin.

Hitherto, as coloring agents, there has been particularly known a reddish coloring agent, e.g., Rhodamine lactone and Rhodamine anilinolactam. But, Rhodamine lactone compounds, e.g., Rhodamine B (Color Index No. 45,170), Rhodamine G (Color Index No. 45,150) and Rhodamine 6 GCP (Color Index No. 45,160) are unstable so that, if they are left under natural conditions, they quickly show coloration in the course of time. Also, a drawback arises in such a manner that a color fog appears on the upper sheet, before the surface of the upper sheet comes into contact with the surface of the under sheet. Further, the Rhodamine anilinolactam compound is stable against natural exposure in the course of time, but the speed of coloration is slow on the portions subjected to pressure by handwriting and it requires several minutes for the color to develop completely.

Furthermore, a hue of color development shows maximum absorption around the range of 550 to 560 m$\mu$ wavelength, and further indicates a slight absorption in the range of 560 to 600 m$\mu$, so that the hue shows purplish red and gives an impression of dark red.

The object of the present invention is to provide a pressure-sensitive copying paper which develops reddish coloration and further is to provide a pressure-sensitive copying paper which develops various optional colorations in combination with conventional coloring agents of yellow, purple, blue and so on.

We have carried out various researches repeatedly, and, as a result, we have invented the present pressure-sensitive copying paper. The copying paper has superior properties to conventional pressure-sensitive copying paper, as is set forth below.

SUMMARY OF THE INVENTION

The present invention relates to a pressure-sensitive transferring sheet as a coloring agent containing at least one fluorane derivative represented by the general formula:

[Chemical structure diagram]

wherein R is a lower alkyl group having from 1 to 4 carbon atoms.

The coloring agents used in the present invention are exemplified and their synthesis is set forth in the following examples:

| Coloring agent No. | Substituents in general formula | | Chemical name |
|---|---|---|---|
| | R | Position of CH₃ group | |
| No. 1 | CH₃ | 5 and 7 | 3-dimethylamino-5,7-dimethyl-fluorane. |
| No. 2 | C₃H₅ | 5 and 7 | 3-diethylamino-5,7-dimethyl-fluorane. |
| No. 3 | C₂H₅ | 6 and 7 | 3-diethylamino-6,7-dimethyl-fluorane. |
| No. 4 | C₂H₅ | A mixture having two ethyl groups selected from 5, 6, 7 and 8 positions, | 3-diethylamino-5,6- (5,7 or 5,8 or 6,7 or 6,8 or 7,8)-dimethyl-fluorane (mixture). |

Synthesis Example 1

0.1 mol of 2'-carboxy-4-dimethylamino-2-hydroxybenzophenone (refer to Beilstein, Organische Chemie: vol. 14, page 675 and the same volume, the first Supplementary Edition, page 710) and 0.1 mol of 2,4-dimethylphenol (or, 2,4-dimethyl anisol) were dissolved into about 180 g. of concentrated sulfuric acid. The resulting mixture was heated at a temperature of 90 to 100° C. This reacted mixture was cooled and then poured into icy water and a precipitate was obtained.

The filtered precipitate was neutralized with aqueous ammonia or an aqueous solution of sodium carbonate and was extracted with chloroform. This extracted solution was washed with water several times and then was concentrated under reduced pressure and a rough crystal was obtained. This rough crystal was re-crystallized in a mixed solvent of benzene-petroleum ether and 28 g. of white crystals having a melting point of 226 to 229° C. were obtained. (Refer to Beilstein, Organische Chemie: vol. 19, page 350. Namely, Synthetic Process of 3-dimethylamino-7-methylfluorane by the use of 4-methylphenol instead of 2,4-dimethylphenol.)

Synthesis Example 2

0.1 mol of 2'-carboxy-4-diethylamino-2-hydroxybenzophenon (refer to Beilstein, Organische Chemie: vol. 14, page 675 and the same volume, the first Supplementary Edition, page 710 and J. Am. Chem. Soc., vol. 38, page 2102) and 0.1 mol of 2,4-dimethylphenol were used. Those were treated in concentrated sulfuric similarly as in the synthetic process of Example 1 and 30 g. of white crystals having a melting point of 202 to 203° C., were obtained.

Synthesis Example 3

3,4-dimethylphenol was used instead of 2,4-dimethylphenol and otherwise the treatments followed the process in Synthesis Example 2. 27 g. of white crystals having a melting point of 219 to 222° C., were obtained.

Synthesis Example 4

Instead of 2,4-dimethylphenol, mixed xylenol was used, i.e., a mixture of ortho, meta and para xylols was used as a starting raw material, and a mixture of 2,3-, 2,4-, 2,5- 3,4- and 3,5- dimethylphenols was obtained. Otherwise the treatments followed the process of Synthesis Example 2. 30 g. of crystals having a melting point of 118 to 135° C., were obtained.

This reaction is considered in such manner that 2,3-dimethylphenol gives the 5,6-dimethyl fluorane derivative; 2,4-(2,5-)dimethylphenol gives the 5,7 - (5,8-)dimethyl fluorane derivative; 3,4-dimethylphenol gives the 6,7- and 7,8-dimethyl fluorane derivative; and 3,5-dimethylphenol yields the 6,8-dimethyl fluorane derivative; and the above mixture consists of these isomers.

But, 2,6-dimethylphenol is not capable of synthesizing the fluorane derivative. The coloring agents No. 1 through No. 4 were dissolved in 95 percent acetic acid and the absorptive maxima for the solution of developing red coloration were listed as follows:

| Coloring Agent | Absorptive maximum (mμ) | Second absorptive maximum (mμ) | Third absorptive maximum (mμ) |
|---|---|---|---|
| No. 1 | 492 | 530 | 466 |
| No. 2 | 497 | 532 | 472 |
| No. 3 | 497 | 533 | 470 |
| No. 4 | 497 | 540 | 498 |

In order that the pressure-sensitive copying paper may be produced from the above-mentioned coloring agents, conventional processes known among those skilled in the art are adopted. For example, processes described in the specification of U.S. Patents Nos. 2,548,366; 2,800,457 and 2,800,458, in other words, processes for producing microcapsules by utilizing coacervation phenomenon, are adopted.

The present invention relates to a pressure-sensitive copying paper which contains a specific compound represented in the aforesaid formula as a coloring agent. This pressure-sensitive copying paper does not vary its capability, even if the process for producing the same copying paper is modified. Therefore, the said copying paper is not limited by the production process. An addition amount of the coloring agent is selected in the range of from 1 to 5% by weight of the amount of oil solvent.

The pressure-sensitive copying paper in accordance with the present invention is colorless prior to the application of pressure. Further, even if it is left in the atmosphere, it is free from natural colored fog and is stable.

Then, if the paper is colored by pressure, the color is developed instantly.

Moreover, the color phase, after color development, shows an efficient favorable absorption around the range of 470 to 550 mμ. So, it gives a bright red color, compared with coloration of conventional pressure-sensitive copying paper. Further, it has a high color concentration and is superior in the properties of light- and water-resistance.

Furthermore, in case it is used in the combination with other conventional coloring agents of yellow, blue, and bluish green, it does not have an unfavorable influence, e.g., reduced sensitivity, which may be caused by mutual interaction with the other coloring agents. Thus, a pressure-sensitive copying paper which develops pure black coloration can be obtained.

Example I 3 g. of coloring agent No. 1 was dissolved into 100 g. of diphenyl trichloride oil and the resulting mixture was added to a solution of 20 g. of gum arabic and 160 g. of water and the mixture was emulsified.

Then, 20 g. of gelatin treated with acid and 160 g. of water were added to the emulsified solution. Then, acetic acid was added to this resulting mixture under constant agitation and the pH value was reduced to 5. Then, 500 g. of water was added to it and coacervation was caused.

In this case, a film consisting of a concentrated solution of gelatin gum arabic was formed around the oil drop which contains a solution of the coloring agent. Next, the pH value was reduced to 4.4, and 4 g. of a 37% solution of formaldehyde in water was immediately added to it to harden the film.

All the above steps were carried out at a temperature of 50° C. Then, in order that the film in the concentrated solution may be gelled, this solution was cooled to 10° C. Then, the pH value was raised to increase the effect of hardening the film. After the solution was left for a period of several hours, the capsulation operation was completely finished.

The capsulated solution, obtained above, was coated on paper by a coating process, e.g., roll coating, or air knife coating, and the paper was dried.

This paper (upper sheet) was overlaid on a clayed paper (lower sheet coated with clay substance), and when a couple of papers were pressed by handwriting, red color was quickly developed on the clayed paper.

This red pigment developed thereon was not entirely faded, even if it was wet with water or exposed directly to sunlight for a long time.

Further, the paper coated with coloring agent (upper sheet) did not deteriorate in its capability for color development, even if it was heated at a temperature of 100° C. for 20 hours or exposed to sunlight for a long time.

In other words, it gave a satisfactory stability in the course of time from the viewpoint of light, water, and thermal resistance, before or after color development.

Example II

Instead of coloring agent No. 1 in Example I, coloring agents Nos. 2 and 3 and No. 4 were individually used. Those resulted in red colors being quickly developed on respective clayed papers. The capabilities, before or after color developments, were observed to be favorable as in the case of Example I.

Example III

When the clayed paper was coated with fuller's earth (Japanese acid clay) and developed to give red coloration, the absorptive maxima for reflection absorptive spectrum of all coloring agents were obtained as listed below:

| Coloring Agent | Absorptive maximum (mμ) | Second absorptive maximum (mμ) | Third absorptive maximum (mμ) |
|---|---|---|---|
| No. 1 | 495 | 532 | 473 |
| No. 2 | 500 | 534 | 480 |
| No. 3 | 500 | 535 | 478 |
| No. 4 | 500 | 532 | 472 |

Example IV 0.9 g. of coloring agent in the present invention (e.g. No. 1), 0.6 g. of benzol leuco methylene blue, 0.7 of malachite green lactone and 0.4 g. of N-phenylleucoauramine (all those are a blue coloring agent) were used in the combination with 0.8 g. of crystal violet lactone (an agent for developing a bluish purple color) and 1.2 g. of 3,6-diethoxy fluorane (an agent for developing a yellow color).

Otherwise, all treatments followed the process of Example I. As a result, black coloration was quickly developed on the clay coated paper.

Further, coloring agents Nos. 2 and 3 and No. 4 were used instead of coloring agent No. 1, in the above practice, and similar results were obtained similarly as in using coloring agent No. 1.

What is claimed is:

1. A pressure sensitive transferring sheet adapted to be used in conjunction with a receiving sheet having an electron accepting layer, to form a pressure-sensitive copying assembly, said transferring sheet comprising a support and coated on said support, a layer containing pressure-rupturable microcapsules, said microcapules containing oil and dissolved therein a coloring agent comprising at least one flourane derivative represented by the general formula:

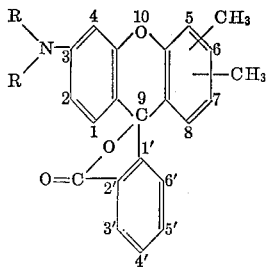

wherein R is a lower alkyl group having from 1 to 4 carbon atoms.

2. A pressure-sensitive transferring sheet as claimed in claim 1, wherein the fluorane derivative is a compound selected from the group consisting of 3-dimethylamino-5,7-dimethylfluorane, 3-diethylamino-5,7-dimethylfluorane, 3-diethylamino-,6,7-dimethylfluorane, 3 - diethylamino-5,6-dimethylfluorane, 3-diethylamino-5,8-dimethylfluorane, 3-diethylamino-5,8-dimethylfluorane, 3-diethylamino-6,8-dimethylfluorane, 3 - diethylamino-7,8-dimethylfluorane and mixtures thereof.

3. A pressure-sensitive transferring sheet as claimed in claim 1 which further contains at least one compound selected from the group consisting of benzoyl leuco methylene blue, malachite green lactone, N-phenyl leuco auramine, crystal violet lactone and 3,6-diethoxy fluorane.

4. A pressure-sensitive transferring sheet as claimed in claim 1 which further contains at least one compound selected from the group consisting of benzoyl leuco methylene blue, malachite green lactone, N-phenyl leuco auramine, crystal violet lactone and 3,6-diethoxy fluorane.

References Cited

UNITED STATES PATENTS

| | | | |
|---|---|---|---|
| 3,020,171 | 2/1962 | Bakan et al. | 117—36.2 |
| 3,244,550 | 4/1966 | Farnham et al. | 117—36.2 |
| 3,336,337 | 8/1967 | Gosnell | 117—36.2 |
| 3,427,180 | 2/1969 | Phillips | 117—36.2 |

MURRAY KATZ, Primary Examiner

U.S. Cl. X.R.

117—36.8; 260—343.3

UNITED STATES PATENT OFFICE
CERTIFICATE OF CORRECTION

Patent No. 3,506,471   Dated April 14, 1970

Inventor(s) Shiro Kimura, Teruo Kobayashi, Sadao Ishige and Shizuo Katayama

It is certified that error appears in the above-identified patent and that said Letters Patent are hereby corrected as shown below:

Claim 4, line 2, change "1" to -- 2 --

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents

FORM PO-1050 (10-69)